United States Patent [19]

McNair

[11] Patent Number: 5,511,806
[45] Date of Patent: Apr. 30, 1996

[54] TWO WAY ROLLING SUITCASE

[76] Inventor: Edward P. McNair, 59 Chimney Ridge Dr., Morristown, N.J. 07960

[21] Appl. No.: 468,140

[22] Filed: Jun. 5, 1995

[51] Int. Cl.⁶ ..................................................... B62B 1/16
[52] U.S. Cl. ........................ 280/47.2; 280/47.26; 280/37; 190/18 A; D34/19
[58] Field of Search ................................ 280/37, 47.16, 280/47.17, 47.2, 47.26, 62; 190/18 A; D34/18, 19

[56] References Cited

U.S. PATENT DOCUMENTS

| 2,478,563 | 8/1949 | Book | 280/47.17 X |
| 3,653,474 | 4/1972 | Sadow | 280/47.17 X |
| 3,655,215 | 4/1972 | Becklin | 280/37 X |
| 3,857,579 | 12/1974 | Hoodenpyle | 280/47.2 |
| 3,861,703 | 1/1975 | Gould | 280/47.17 X |
| 4,311,222 | 1/1982 | Castanier | 280/47.26 X |
| 4,335,896 | 6/1982 | Koffler et al. | 280/47.17 |
| 4,418,804 | 12/1983 | Bradley et al. | 280/37 X |
| 4,570,958 | 2/1986 | Walker | 280/40 |
| 4,838,396 | 6/1989 | Krenzel | 280/37 X |
| 4,978,132 | 12/1990 | Wilson et al. | 280/47.131 |
| 5,377,795 | 1/1995 | Berman | 280/47.26 X |
| 5,379,870 | 1/1995 | Sadow | 280/37 X |

Primary Examiner—Brian L. Johnson

[57] ABSTRACT

A rolling suitcase (10), equipped with a pair of wheels (14) on one edge (18) of its base (26), can be transported by tilting the suitcase (10) so that only wheels (14) are in contact with the surface. A second set of wheels (20) are mounted on an adjacent narrower edge (24) of base (26). When approaching a narrow restriction the user would tilt suitcase (10) so that only wheels (20) are in contact with the surface, and proceed thru the restriction. A second embodiment utilizes a caster (36) near the corner of edge (18) and edge (24) in conjunction with a single wheel (14) or single wheel (20).

1 Claim, 4 Drawing Sheets 5,511,806

TWO WAY ROLLING SUITCASE

BACKGROUND OF THE INVENTION

1. Field of the Invention

The present invention pertains to a luggage type container, usually a manually transported suitcase, that is equipped with wheels or rollers to enable the user to transport the suitcase by pushing or pulling it rather than lifting and carrying it.

2. Description of Prior Art

Suitcases with built in wheels or ball bearings that allow them to be transported by being towed along a floor rather than being carried have become popular in recent years as more people carry their own luggage.

One earlier type of suitcase uses four casters mounted on the perimeter of the base of the suitcase which is towed with a strap. The disadvantage of this system is that the suitcase tends to wander or "fishtail" so it is difficult to control. As a result, this system is currently not very popular.

Most suitcases are built in the general shape of a right rectangular parallelepiped, or prism, having three unequal dimensions. One type of suitcase that has become increasingly popular is one that has two wheels mounted on a rigid axle or axles located along an edge where the base and one side of the suitcase intersect. The user tilts the opposite end, which is the top of the suitcase, so that only the two wheels remain on the floor, then pulls and steers the suitcase by means of a rigid handle extending from one of the top edges. Except for the wheels, the suitcase is held off the ground by the user keeping the rigid handle partially elevated. The axles are perpendicular to the direction of travel so that while the wheels are rolling, they remain fixedly oriented with respect to the suitcase.

A frequent configuration for this type of suitcase is to have the height be the longest dimension. Some manufacturers refer to this type of case as "upright suitcase" to distinguish it from the traditional, hand carried, suitcase which usually had its longest dimension horizontal. When, stationary in the upright position, the base of this type of suitcase, which includes the set of wheels and any small support legs, rests on the ground, and the handle extends from the top. Thus the base is in the shape of a rectangle. The longer edges of the base have the intermediate dimension of the prism and the shorter edges of the base have the shortest dimension. If the suitcase is built with the wheels located along a longer edge, the wheelbase can be made wider. When being transported in this manner, the center of gravity of the suitcase will be lower, and the suitcase will be more stable and easier to manage.

The disadvantage of mounting the wheels along this longer edge is that the towed suitcase can be too wide to fit through such things as narrow doorways or the aisles of commercial airliners. Currently, many passengers lift and carry their wheeled luggage down the narrow aisle of an aircraft. In order to do so, they must hold the suitcase awkwardly either in front or behind them.

The disadvantage of building the suitcase with the wheels located along a shorter edge is that while the suitcase will fit through narrow restrictions it will tip easily when going over bumps or traversing sloped surfaces in open areas.

SUMMARY OF THE INVENTION

OBJECTS AND ADVANTAGES

An object of the invention is to enable the user to choose at any time to transport the above type of suitcase either by means of wheels mounted along a longer edge of the base or by means of wheels mounted along a shorter edge of the base. The advantages of the present invention are:

(a) the user can tow the suitcase in large open areas, such as parking lots and airline terminals at a rapid pace when using the wheels on the wider edge of the base. Typically, when emplaning or deplaning airliners, passengers move at a slower pace and the wheels on the narrower edge will provide adequate stability;

(b) the suitcase can be built with a wider base and thus have a greater capacity;

(c) when the wider base is used, the user can attach, or "piggyback" smaller items, such as a folded garment bag, briefcase, or notebook computer on the upper surface of the suitcase. These items can be detached and hand carried when walking down the aisle of the aircraft.

The object of the present invention is accomplished by mounting a second set of wheels on another edge of the suitcase common to the base to which the first set is mounted. Tipping the suitcase on one of the wheeled edges elevates the wheels on the other edge and the suitcase rolls on one of the sets of wheels at a time.

Still further objects and advantages will become apparent from a consideration of the ensuing description and drawings.

DESCRIPTION OF THE INVENTION

Figure 1:
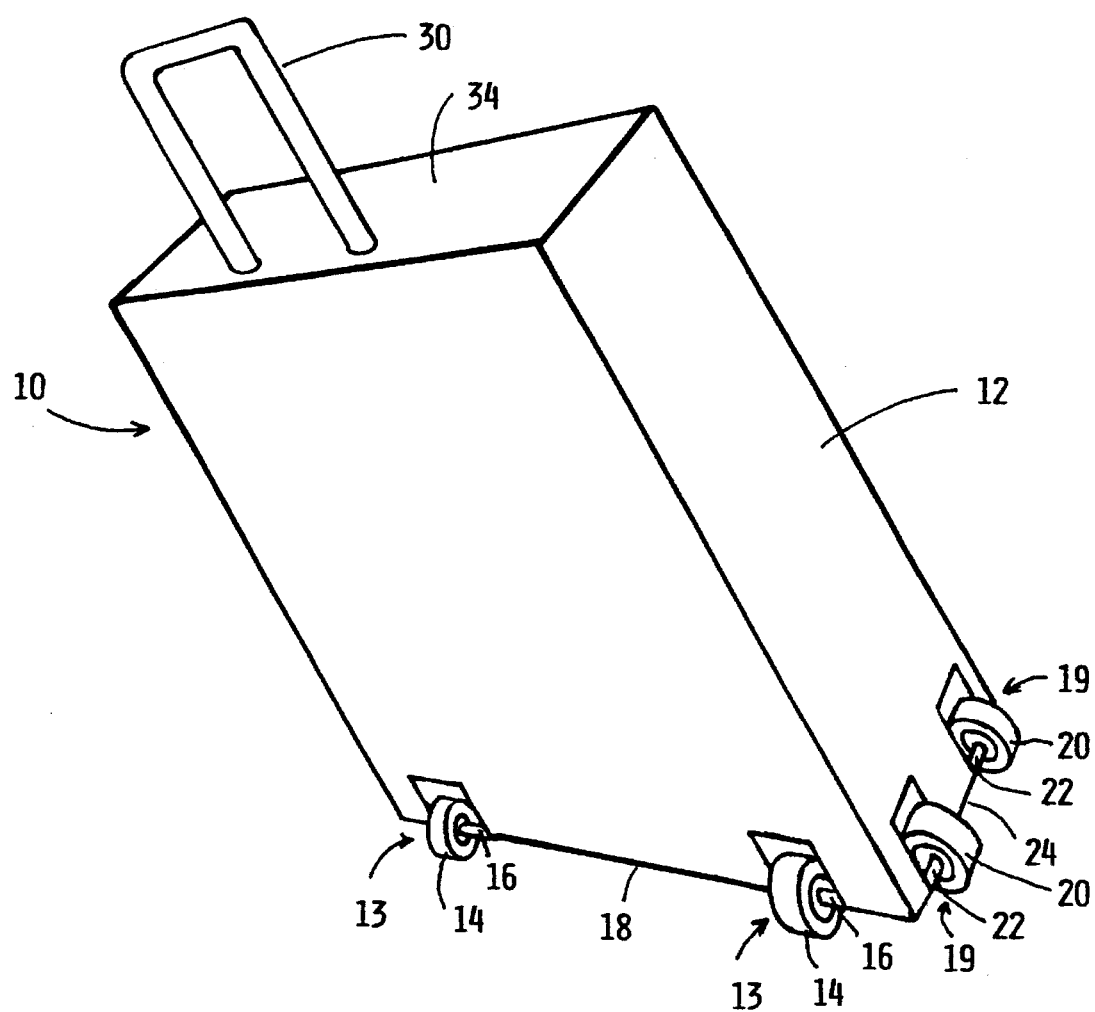
FIG. 1 is a perspective view of one embodiment of the suitcase in the present invention illustrating the case in an inclined position with the longer wheelbase positioned on the surface over which the case is rolling. The case has two wheels on each of two adjacent edges.
Figure 2:
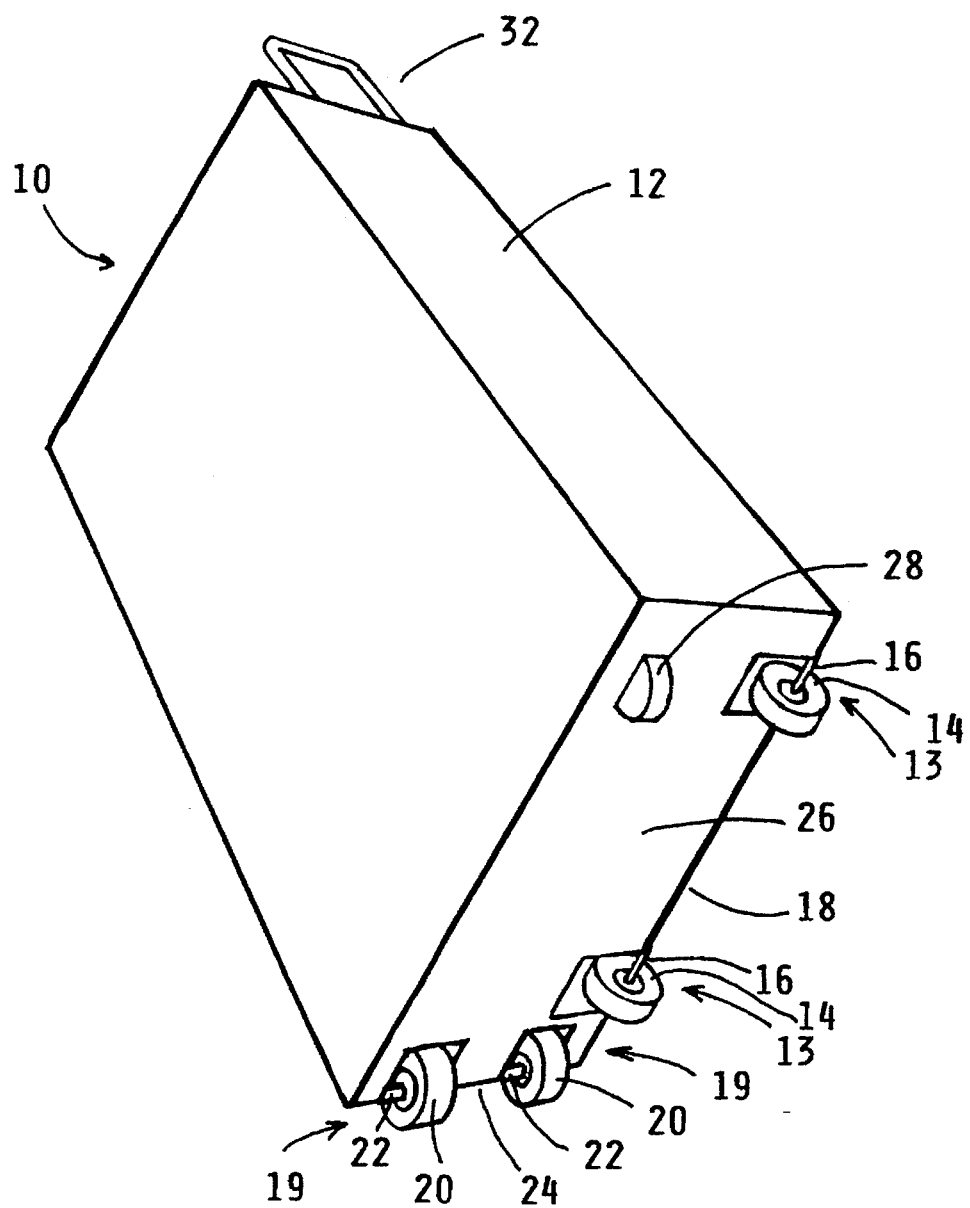
FIG. 2 is a perspective view of the case of FIG. 1 with the shorter wheelbase positioned on the surface.

The preferred embodiment of the invention, illustrated in FIGS. 1 and 2, is a rolling suitcase 10 having a luggage container 12 in the shape of rectangular prism having a planar surface, or base 26 at its lower end. Base 26 has the shape of a rectangle with unequal sides, or edges. Edge is preferably a longer edge. Edge 24 is preferably a shorter edge.

A pair of wheel assemblies 13, comprised of a wheel 14 rotatably mounted on a ridged axle 16, are molded in parallel into longer edge 18. Wheels 14 extend outwardly of edge 18 so that wheels 14 engage the surface when suitcase 10 is upright or when suitcase 10 is tilted on edge 18. A pair of wheel assemblies 19, comprised of a wheel 20 mounted on a ridged axle are molded in parallel into shorter edge 24. Wheels 19 extend outwardly of edge 24 so that wheels 19 engage the surface when suitcase 10 is upright or when suitcase 10 is tilted on edge 24.

Since edges 18 and 24 are perpendicular to each other with respect to base 26, wheels 14 fixedly rotate in a direction perpendicular to the fixed rotation of wheels 20. An adjunct to base 26 is a foot pad 28.

A handle 30 and a handle 32 are mounted on a top surface 34 of container 12. Handle 30 is aligned with wheels 14 and handle 32 is aligned with wheels 20. Handles 30 and 32 can either telescope or fold to fit flush with surface 34 when not in use. Foot pad 28, and handles 30 and 32 are conventional in construction and therefore do not form any part of the present invention.

Figure 3:
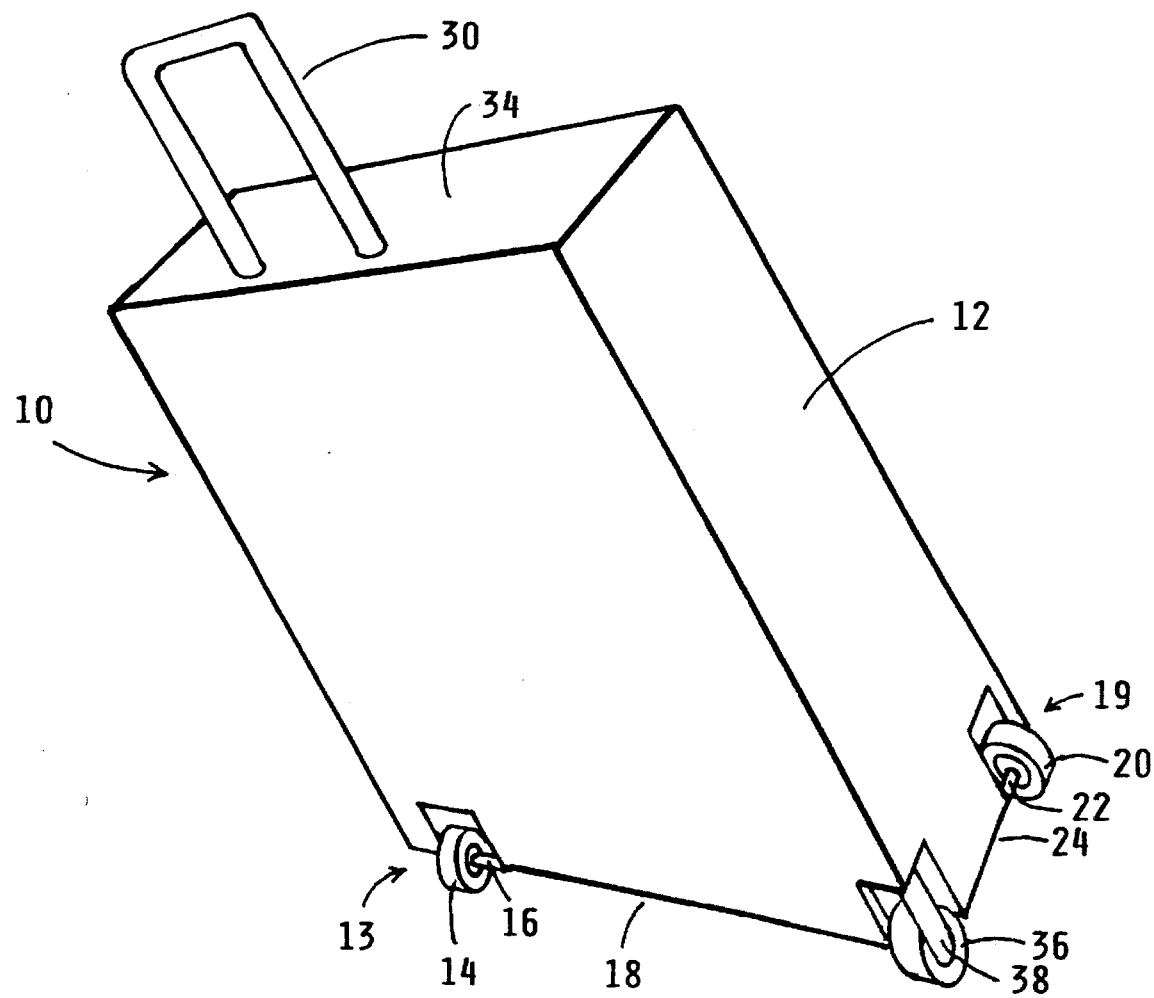
FIG. 3 is a perspective view of a second embodiment of the suitcase in the present invention illustrating the case in an inclined position with the longer wheelbase positioned on the surface over which the case is rolling. The case has one wheel on each of two mutually perpendicular edges and a caster adjacent to the intersection of these edges.
Figure 4:
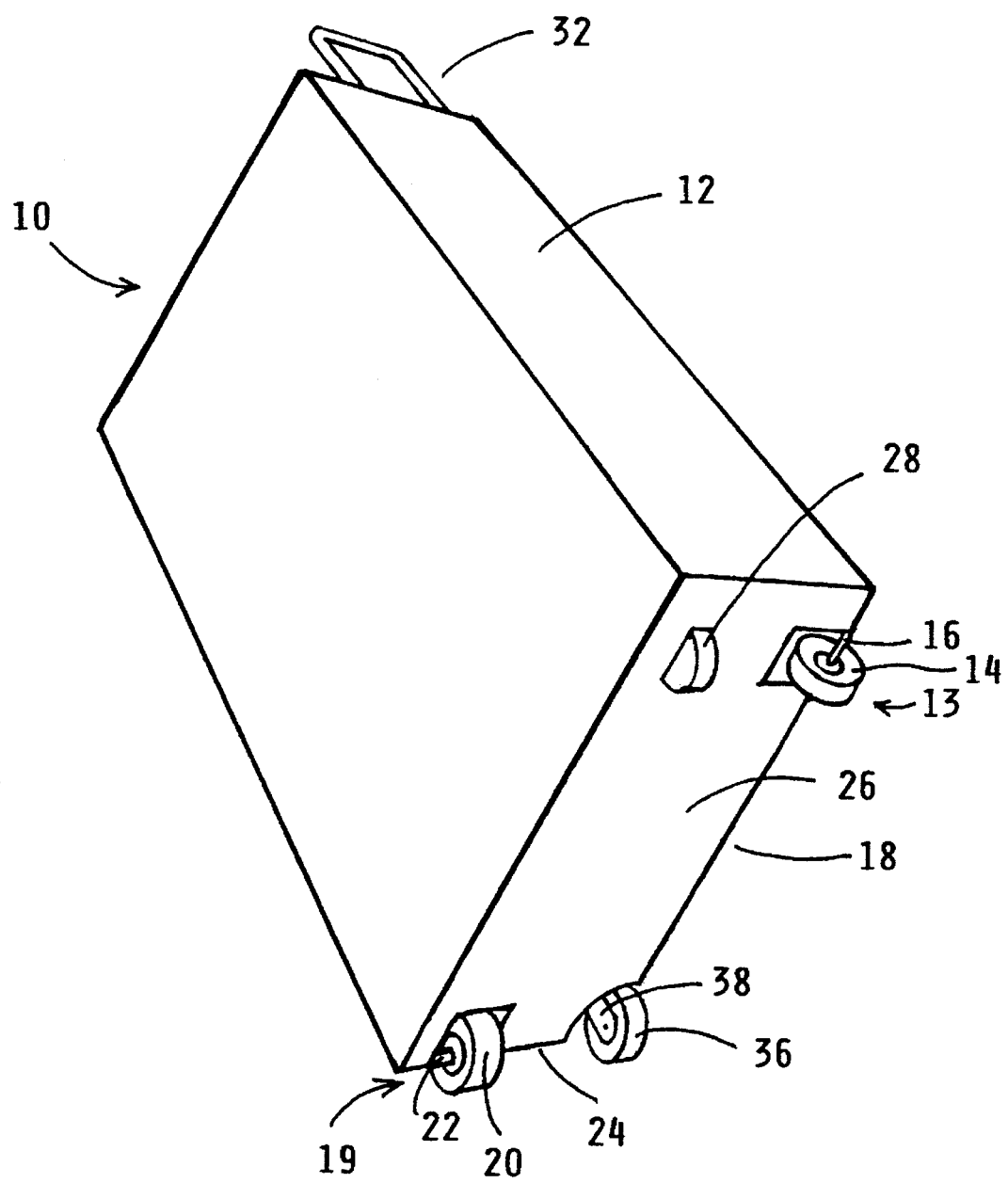
FIG. 4 is a perspective view of the case of FIG. 3 with the shorter wheelbase positioned on the surface.

A second embodiment is shown in FIGS. 3 and 4.

Operation of the Invention

In the preferred embodiment, when container 12 is set on base 26, both pairs of wheels 14 and 20 rest on the ground. Foot pad 28, located on a corner of base 26 opposite wheels 14 and 20, provides additional support to container 12.

FIG. 1 shows the operation of this embodiment in open areas. To roll container 12 over ground or floor surfaces in areas such as parking lots and transportation terminals, the user would grasp handle 30, tilt container 12 so that only wheels 14 are in contact with the surface and push or pull container 12.

FIG. 2 shows the operation of this embodiment in confined areas. When approaching a narrow restriction such as boarding an aircraft, the user would set container 12 on its base, grasp handle 32, tilt container 12 so that only wheels 20 are in contact with the surface, and proceed thru the restriction.

Other Embodiment

In the second embodiment, container 1 2 has one wheel assembly 13 mounted on edge 18, and one wheel assembly 19 mounted on edge 24. A caster 36 is mounted in a swivel frame 38. Frame 38 is attached to base 26 at a point near the convergence of the axes of rotation of assembly 13 and assembly 19 and adjacent to the corner of the two edges 18 and 24. In this position, the caster projects outwardly so that it will engage the surface when suitcase 10 is tilted on either edge 18 or edge 24.

FIG. 3 shows the operation of this embodiment in open areas. When container 12 is tilted on edge 18 so that only wheel 14 and caster 36 are in contact with a surface and the user causes container 12 to roll, caster 36 will align itself in parallel with wheel 14.

FIG. 4 shows the operation of this embodiment in confined areas. When container 12 is tilted on edge 24 so that only wheel 20 and caster 36 are in contact with a surface and the user causes container 12 to roll, caster 36 will align itself in parallel with wheel 20.

Having at least one load bearing wheel or roller, mounted on a rigid axle, fixedly rotating in contact with the floor surface is an important advantage in controlling the container, especially when travelling across uneven or non level surfaces such as door sills or inclined ramps. In contrast, a suitcase with four casters mounted on the perimeter of its base, mentioned in "Description of Prior Art" above, will roll when tipped on any of four edges; however, it will swerve from side to side, or "fishtail" when traversing any irregular surface. This would make a suitcase unstable and difficult to control, thus negating the purpose and advantage of the present invention.

It should be further noted that while foot pad 28 has been shown on both embodiments, should suitcase 10 be left in the upright position without foot pad 28 in contact with the supporting surface, suitcase 10 might pivot, but will not roll out of place.

Summary, Ramifications, and Scope

Accordingly, the reader will see that the invention provides a rolling suitcase with the stability of a wide wheelbase and the ability to roll through narrow obstructions.

Although the description above contains many specificities, these should not be construed as limiting the scope of the invention but as merely providing illustrations of some presently preferred embodiments of the invention. Variations and rearrangements of the parts may be made without departing from the spirit and scope of the underlying inventive concept.

Thus the scope of the invention should be determined by the appended claims and their legal equivalents, rather than by the examples given.

What is claimed is:

1. A suitcase comprised of:

(a) a luggage container comprised of a generally rectangular base having longer and shorter edges;

(b) a first wheel assembly comprised of at least one wheel rotatably mounted on at least one axle, said axle fixedly mounted parallel to one of said longer edges, said axle mounted adjacent to said longer edge, wherein said wheel projects outwardly of said edge for engagement with a surface;

(c) a second wheel assembly comprised of at least one wheel rotatably mounted on at least one axle, said axle fixedly mounted parallel to one of said shorter edges, said axle mounted adjacent to said shorter edge, wherein said wheel projects outwardly of said edge for engagement with said surface;

(d) wherein said wheel of one said assembly is rotatably mounted perpendicular to said wheel of the other said assembly;

(e) a caster mounted on a swivel frame, said frame mounted on said base, said frame mounted adjacent to the convergence of the axes of rotations of said first wheel assembly and said second wheel assembly corresponding to a corner of said base, wherein said caster projects outwardly of said convergence for engagement with said surface.

* * * * *